(12) United States Patent
Inbe et al.

(10) Patent No.: US 6,419,731 B2
(45) Date of Patent: Jul. 16, 2002

(54) NONCHROMATE RUST PREVENTIVE AGENT FOR ALUMINUM, METHOD OF RUST PREVENTION AND RUST-PREVENTIVE ALUMINUM PRODUCTS

(75) Inventors: Toshio Inbe, Kanagawa; Masashi Takahashi, Tokyo; Katsuyoshi Yamasoe, Chiba, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/833,070

(22) Filed: Apr. 12, 2001

(30) Foreign Application Priority Data

Apr. 20, 2000 (JP) .................................. 2000-119081

(51) Int. Cl.⁷ .......................... C23C 22/05; C23F 11/00
(52) U.S. Cl. ................ 106/14.44; 148/247; 427/388.1; 427/388.4; 428/469
(58) Field of Search ..................... 106/14.44; 148/247; 427/388.1, 388.4; 428/469

(56) References Cited

U.S. PATENT DOCUMENTS

| 4,313,769 A | * | 2/1982 | Frelin et al | 148/247 |
|---|---|---|---|---|
| 4,370,177 A | * | 1/1983 | Frelin et al. | 148/247 |
| 4,496,404 A | * | 1/1985 | King | 148/247 |
| 4,617,068 A | * | 10/1986 | King | 148/273 |
| 5,139,586 A | * | 8/1992 | Das | 148/246 |
| 5,332,452 A | * | 7/1994 | Das | 148/247 |
| 5,380,374 A | * | 1/1995 | Tomlinson | 148/247 |
| 5,441,580 A | * | 8/1995 | Tomlinson | 148/247 |
| 5,728,233 A | * | 3/1998 | Ikeda et al. | 148/247 |
| 5,868,872 A | * | 2/1999 | Karmaschek et al. | 148/247 |

FOREIGN PATENT DOCUMENTS

| JP | 55 38997 | 10/1980 |
|---|---|---|
| JP | 04 232281 | 8/1992 |
| JP | 11 106954 | 4/1999 |

* cited by examiner

*Primary Examiner*—Anthony J. Green
(74) *Attorney, Agent, or Firm*—Shanks & Herbert

(57) ABSTRACT

A nonchromate rust preventive agent for aluminum which comprises a zirconium compound, a fluoride ion, a water-soluble resin and an aluminum salt. Also an aluminum product treated with the nonchromate rust preventive agent is provided.

13 Claims, No Drawings

NONCHROMATE RUST PREVENTIVE AGENT FOR ALUMINUM, METHOD OF RUST PREVENTION AND RUST-PREVENTIVE ALUMINUM PRODUCTS

FIELD OF THE INVENTION

The present invention relates to the nonchromate rust prevention of aluminum and more particularly to a nonchromate rust preventive agent suited to the treatment of aluminum sheeting in a coil form, a method of rust prevention and a rust-preventive aluminum product.

BACKGROUND OF THE INVENTION

The rust prevention of aluminum or aluminum alloy has heretofore been made by spraying or dipping using a reactive chromate or phosphate-chromate agent or a coating-type chromating agent. In the field of such chromating agents, there have been developed those which are comparatively environment-benign through contrivances such as film weight reduction or replacement of the harmful hexavalent chromium with the low-toxicity trivalent chromium. However, the risk for environmental contamination at waste disposal cannot be said to be nil.

On the other hand, with regard to the nonchromate reactive type treating agent and coating type treating agent, Japanese Kokoku Publication Sho-55-38997, for instance, discloses an acidic cleaning agent comprising polyacrylic resin and zirconium fluoride, among other components. Further, Japanese Kokai Publication Hei-4-232281 discloses an aqueous acidic solution comprising an anionic acrylic acid-acrylamide copolymer, zirconyl ammonium fluoride and nitric acid. Japanese Kokai Publication Hei-11-106954 discloses an acidic treating composition comprising a water-soluble phenolic resin, a zirconium or other metal-containing compound, a silane coupling agent, and hydrofluoric acid, phosphoric acid and/or acetic acid.

However, the corrosion resistance imparted by the nonchromate type treating agents disclosed in the above patent publications is invariably poor as compared with that provided by chromate type treating agents and has not satisfied practical needs. The object of the present invention is to provide a nonchromate rust preventive agent for aluminum which, despite its being of the nonchromate type, is capable of affording sufficient corrosion resistance and, even when applied to the material for heat-exchanger fins, for instance, does not allow development of white rust. A further object is to provide a method of rust prevention and a rust-preventive aluminum product.

SUMMARY OF THE INVENTION

The nonchromate rust preventive agent for aluminum according to the present invention comprises a zirconium compound, a fluoride ion, a water-soluble resin and an aluminum salt, the concentration of said zirconium compound being 100 to 100000 ppm as zirconium ion, the concentration of said fluoride ion being 125 to 125000 ppm, the concentration of said water-soluble resin being 100 to 100000 ppm on a nonvolatile basis, and the concentration of said aluminum salt being 10 to 10000 ppm as aluminum ion.

The fluoride ion concentration, when a fluorozirconium compound is used as said zirconium compound, represents the sum of the concentration derived from the fluorine compound and the concentration derived from the fluorozirconium compound.

As said zirconium compound, a fluorozirconic acid and/or an ammonium fluorozirconate may be used.

Moreover, said water-soluble resin preferably has a functional group capable of binding to said zirconium compound and/or aluminum in film formation.

The method of nonchromate rust prevention according to the present invention comprises treating an aluminum substrate with said rust preventive agent to form the film in the weight range of 10 to 1000 mg/m$^2$ in terms of zirconium.

The rust-preventive aluminum product of the present invention is obtainable by a nonchromate rust preventive treatment using said rust preventive agent.

DETAILED DESCRIPTION OF THE INVENTION

The present invention is now described in detail.

As mentioned above, the nonchromate rust preventive agent of the invention comprises a zirconium compound, a fluoride ion, a water-soluble resin and an aluminum salt.

The above zirconium compound is a cardinal component capable of binding to the aluminum (inclusive of aluminum alloy; the same applies hereinafter) surface etched by the fluoride ion to form a rust preventive layer and, at the same time, binding to and curing the water-soluble resin to insure formation of a tough resin film. As examples of such zirconium compound, a there can be mentioned fluorozirconic acid, the lithium, sodium, potassium and ammonium salts of fluorozirconic acid, zirconium sulfate, zirconyl sulfate, zirconiumnitrate, zirconyl nitrate, zirconium fluoride and zirconium carbonate, among others. These zirconium compounds can be used singly or in a combination of two or more species. The preferred concentration of the zirconium compound in the rust preventive agent is 100 to 100000 ppm as zirconium ion, the range of 1000 to 10000 ppm being still more preferred. When the zirconium ion concentration is less than 100 ppm, corrosion resistance and adhesion to the hydrophilic coating film to be used for heat-exchanger fins tend to be decreased. On the other hand, formulating the zirconium compound in excess of 100000 ppm will not be rewarded with any further improvement in performance but rather increases the cost of production.

The fluoride ion mentioned above can be supplied by using, for example, hydrofluoric acid, ammonium fluoride, ammonium hydrogen fluoride, sodium fluoride, sodium hydrogen fluoride or the like. When a fluorine-containing zirconium compound, such as fluorozirconic acid and ammonium fluorozirconate, is used as the zirconium ion donor, the fluoride ion is partly supplied from such a compound. The fluoride ion concentration of the rust preventive agent is preferably 125 to 125000 ppm, more preferably 1250 to 12500 ppm. The fluoride ion concentration referred to above is the concentration of the fluoride ion present in free state in the rust preventive solution and can be measured by using an instrument having a fluoride ion electrode, for instance. When the fluoride ion concentration is lower than 125 ppm, the degree of etching of the aluminum surface is insufficient so that no adequate rust preventive film may be constructed. Exceeding 125000 ppm is not rewarded with any further improvement in performance but rather increases the cost burden. The zirconium-fluorine ratio, Zr/F, is preferably 0.5 to 0.9 by weight, more preferably 0.6 to 0.8 by weight. Above or below this range, no sufficient corrosion resistance is obtained.

The above water-soluble resin preferably has a functional group, such as carboxyl, hydroxyl, sulfo, amino or the like, which is capable of binding to the zirconium compound and/or aluminum substrate in film formation. As examples of such water-soluble resin, the following can be mentioned.

(a) Unsaturation-polymerizable water-soluble polymers having carboxyl and/or hydroxyl groups, such as poly(meth)acrylic acid, (meth)acrylic acid-(meth)acrylate copolymers, styrene-(meth)acrylic copolymers, polyvinyl alcohol obtainable by partial saponification of polyvinyl acetate resin, polyvinylpyrrolidone, and polymers of (meth)acrylamide derivatives such as N-methylolated (meth)acrylamide.

(b) Naturally-occurring macromolecular compounds having carboxyl and/or hydroxyl groups as well as their derivatives, for example cellulose derivatives such as carboxymethylcellulose (CMC), hydroxyethylcellulose (HEC), hydroxypropylcellulose (HPC), methylcellulose (MC), ethylcellulose (EC), ethylhydroxyethylcellulose (EHEC), etc., ethylcellulose derivatives and their sodium, potassium and ammonium salts, among others.

(c) Water-soluble polyester resins, for example the water-solubilized resin obtainable by half-esterification of the hydroxyl group of a polyester resin with trimellitic anhydride and neutralization of the residual carboxyl group with an amine or the like and the water-soluble resin obtainable by reacting polyethylene glycol with a polybasic acid.

(d) Water-soluble epoxy resins, for example water-soluble epoxy resins such as di- or polyglycidyl ethers of aliphatic polyhydric alcohols, diglycidyl esters of dicarboxylic acids, nitrogen-containing heterocycle-containing epoxy compounds, etc. and water-dispersible epoxy resins obtainable by dispersing or emulsifying epoxy resins in water or a water-organic solvent mixture with the aid of an emulsifier or modifying epoxy resins so as to make them water-soluble or water-dispersible and -emulsifiable.

(e) Water-soluble polyurethane resins, for example the polyurethane resin solubilized by introducing an anionic or cationic group into the molecule, the resin obtainable by causing a bisulfite to be added to the terminal isocyanato group of a urethane prepolymer to block the isocyanato group and rendering it water-soluble by taking advantage of the hydrophilicity of the sulfonate, and the resin obtainable by blocking a urethane prepolymer with a blocking agent and emulsifying or dispersing the same by force.

(f) Water-soluble phenolic resins, such as polycondensation products of phenolic hydroxyl-containing compounds, such as phenol, xylenol, p-alkylphenols, p-phenylphenol, chlorophenol, bisphenol A, phenolsulfonic acid, resorcinol, etc., with an aldehyde, such as formaldehyde, furfural or the like. These are generally known as phenol-formaldehyde resin, cresol-formaldehyde resin, phenol-furfural resin, resorcinol resin and so on.

(g) Water-soluble amino resins, for example melamine resins such as n-butylatedmelamine resin, isobutylated-melamine resin, etc., urea resins and other resins, which have been rendered water-soluble.

The water-soluble resins mentioned above may be used singly or two or more of them may be used in combination. The concentration of the water-soluble resin in the rust preventive agent of the invention is preferably 100 to 100000 ppm, more preferably 1000 to 10000 ppm, on a nonvolatile matter basis. When the resin concentration is lower than 100 ppm, corrosion resistance and water resistance tend to be inadequate. On the other hand, exceeding 100000 ppm will not be rewarded with any further improvement in performance but rather increase the cost burden.

The concentration of the aluminum salt in the rust preventive agent of the invention is preferably in the range of 10 ppm to 10000 ppm, more preferably 100 to 5000 ppm, in terms of aluminum ion. As examples of the aluminum salt that can be used, there can be mentioned aluminum nitrate, aluminum sulfate, aluminum fluoride, aluminum oxide, alum, aluminum silicate, aluminates such as sodium aluminate, and fluoroaluminates such as sodium fluoroaluminate. When the concentration of aluminum ion is less than 10 ppm, the curing reaction of the film may not be sufficiently promoted so that corrosion resistance will be inadequate. On the other hand, when it exceeds 10000 ppm, the curing reaction of the film is hindered and a sludge tends to be formed in the treating solution.

In the coating-type rust preventive agent according to the invention, the fluoride ion etches the aluminum substrate during the time following application of the composition till the film dries so that the zirconium is bound to the etched surface to form a rust preventive layer and, at the same time, acts on the resin as well to assist in the formation of a resin layer. In the course, it is supposed that the aluminum ion supplied from the aluminum salt appears to increase the reactivity of zirconium with the resin to thereby facilitate formation of a rust preventive film.

Furthermore, when a coating-type rust preventive agent containing a zirconium compound as a rust inhibitor is caused to cure and form a film, the water-soluble resin and zirconium bind to each other and form a film so that the fluoride ion tends to be left alone and redundant so that the corrosion resistance tends to be adversely affected. However, if the fluoride ion concentration in the treating agent is nil or too low, the reaction between the aluminum substrate and zirconium will be so retarded that no sufficient corrosion resistance may be obtained by the coating-type rust preventive agent. In the rust preventive agent of the present invention, an aluminum ion is supplied from an aluminum salt, with the result that, in the course of formation of a rust preventive film, the aluminum ion captures the excess of fluoride ion to form fluoroaluminum. It is likely that the above mechanism is involved in the enhancement of corrosion resistance.

In the rust preventive agent of the present invention, various additives may also be formulated in suitable amounts. As such additives, there can be mentioned aluminum sludge inhibitors such as tannic acid, imidazole, etc.; reaction-accelerating oxidizing agents such as hydrogen peroxide, molybdic acid, etc.; resin curing agents such as metal oxides, phenolic resin, etc.; and bath-stabilizing chelating agents.

In the method for nonchromate rust prevention according to the invention, the above rust preventive agent is used to form a rust preventive film on an aluminum sheet or a shaped article of aluminum. The aluminum sheet includes the precoated sheet and foil supplied in the coil form. The shaped article of aluminum includes aluminum cans for beverages, aluminum wheels and other castings.

For rust-preventing the aluminum sheet, the sheet is degreased in advance where necessary and the rust preventive agent of the invention is applied. This application can be made with a bar coater or a roll coater. An alternative method comprises dipping the sheet in a bath of the rust preventive agent and wringing out the surplus agent with a squeeze-roll. For the treatment of a shaped article of aluminum, it is recommendable to use the method which comprises dipping the article in the bath and subjecting it to centrifugation or the air-curtain coating method. When the dipping method is used, the rust preventive treatment bath is supplied with aluminum ion from the aluminum substrate as well. Therefore, the aluminum ion concentration should be maintained within the above-mentioned range by adjusting the aluminum salt content of the bath refill.

The coating amount of the rust preventive agent should be equivalent to a film weight of 10 to 1000 mg/m$^2$, preferably 10 to 300 mg/m$^2$, as zirconium. When the film weight is less than 10 mg/m$^2$, both corrosion resistance and water resistance are inadequate. On the other hand, exceeding 1000 mg/m$^2$ will not be rewarded with any further improvement in performance but rather cause an economic disadvantage. The aluminum is finally dried by heating at 70 to 150° C. for 10 seconds to 1 minute.

The aluminum product according to the invention, as treated for rust prevention by the above method, carries a rust preventive film equivalent to 10 to 1000 mg/m$^2$ of zirconium. When the rust-preventive aluminum product is a sheet, it can be subjected to a hydrophilic treatment and used with advantage in such applications as heat-exchanger fins.

The rust preventive agent of the present invention is formulated to contain an aluminum salt so that, when it is applied for rust prevention, aluminum ions will be available in the system. As a result, the reactivity between zirconium and resin is promoted to facilitate formation of a rust preventive film. Therefore, the composition provides high degrees of corrosion resistance and rust inhibition fully emulating those provided by the conventional chromating agents.

The aluminum product of the invention as treated with the rust preventive agent of the invention can substitute the chromating agent as mentioned above so that it finds application in a broad field. Particularly, it is very suited to the treatment of aluminum sheeting in the form of a coil for use as the material of heat-exchanger fins.

EXAMPLES

The following examples and comparative examples illustrate the invention in further detail.

Example 1

Preparation of a Rust Preventive Agent

A nonchromate coating-type rust preventive agent containing 5000 ppm, as Zr, of fluorozirconic acid, 15000 ppm, on a nonvolatile matter basis, of polyacrylic acid and 1000 ppm, as Al ion, of aluminum nitrate in pure water was prepared.

Rust Prevention

An aluminum sheet (Al 100) for heat-exchanger fin use was provided. First, this sheet was sprayed with a degreasing agent of 1 mass % concentration (Surf Cleaner 340, Nippon Paint) at 70° C. for 5 seconds, rinsed and dried. Then, the above rust preventive agent was applied with a bar coater and baked at 120° C. for 20 seconds to prepare a test sheet for evaluation. The film weight was controlled by adjusting the size of the bar coater, using #10 as the standard.

Methods for Evaluation

<Salt Spray Test>

The 5% salt spray test (360 hr) was performed in accordance with JIS Z 2371 and, after the exposure, the corrosion rate of the test sheet was investigated. Each figure in Table 1 was obtained by estimating the rusted surface area of the test sheet macroscopically and rating the finding on a 10-point scale (the higher the figure is, the lower is the corrosion rate).

<Moisture Resistance Test>

A moisture resistance test (360 hr) was performed in an atmosphere of 50° C., RH≧98% and, after the exposure, the corrosion rate of the test sheet was evaluated. Each figure in Table 1 was obtained by estimating the rusted surface area of the test sheet macroscopically and rating the finding on a 10-point scale (the higher the figure is, the lower is the corrosion rate).

Examples 2 to 8 Comparative Example 1 to 4

Except that the amount and kind of zirconium compound, the amount of hydrofluoric acid, kind and amount of water-soluble resin, kind and amount of aluminum salt and/or film weight of zirconium were varied, test sheets were prepared as in Example 1 and evaluated similarly. The formulations and results of evaluation are shown in Table 2.

TABLE 1

| Example | 1 | 2 | 3 | 4 | 5 | 6 | 7 | 8 |
|---|---|---|---|---|---|---|---|---|
| Zr. Compound | | | | | | | | |
| Species | A | A | A | B | A | A | A | A |
| ppm[1*] | 3000 | 100 | 100000 | 2000 | 3000 | 3000 | 3000 | 3000 |
| F ion conc. (ppm) | 3750 | 125 | 125000 | 2500 | 3750 | 3750 | 3750 | 3750 |
| Water-soluble resin | | | | | | | | |
| Species | D | D | D | E | D | D | D | D |
| ppm | 15000 | 100 | 100000 | 4000 | 15000 | 15000 | 15000 | 15000 |

TABLE 1-continued

| Example | 1 | 2 | 3 | 4 | 5 | 6 | 7 | 8 |
|---|---|---|---|---|---|---|---|---|
| Al salt | | | | | | | | |
| Species | F | F | F | G | F | F | F | F |
| ppm[2]* | 1000 | 10 | 10000 | 500 | 1000 | 1000 | 1000 | 1000 |
| Additive | | | | | | | | |
| Kind | — | — | — | — | Tannic acid | Hydrogen peroxide | Phenolic resin | Gluconic acid |
| ppm | — | — | — | — | 1000 | 500 | 1000 | 100 |
| Zr film weight (mg/m$^2$) | 100 | 10 | 1000 | 60 | 100 | 100 | 1000 | 100 |
| Salt spray test | 10 | 8 | 10 | 10 | 10 | 10 | 10 | 10 |
| Moisture resistance test | 10 | 10 | 10 | 10 | 10 | 10 | 10 | 10 |

[1]*as Zr
[2]*as Al
A . . . Fluorozirconic acid,
B . . . Ammonium fluorozirconate,
C . . . Zirconyl ammonium carbonate,
D . . . Poly(acrylic acid),
E . . . Poly(vinyl alcohol),
F . . . Aluminum nitrate,
G . . . Aluminum sulfate

TABLE 2

| Compar. Ex. | | 1 | 2 | 3 | 4 |
|---|---|---|---|---|---|
| Zr compound | Species | — | A | A | C |
| | ppm*[1] | 0 | 3000 | 3000 | 3000 |
| Hydrofluoric acid (ppm) | | 2500 | 3750 | 3750 | 0 |
| Water-soluble resin | Species | D | — | D | D |
| | ppm | 15000 | 0 | 15000 | 15000 |
| Aluminum salt | Species | F | F | — | F |
| | ppm*[2] | 1000 | 1000 | 0 | 1000 |
| Additive | Kind | — | — | — | — |
| | ppm | — | — | — | — |
| Zr film weight (mg/m$^2$) | | 0 | 100 | 100 | 100 |
| Salt spray test | | 1 | 3 | 2 | 2 |
| Moisture resistance test | | 1 | 3 | 2 | 2 |

It will be apparent from Table 1 that the test sheets treated with the rust preventive agents of the examples were superior in the corrosion resistance evaluated by the salt spray test and lower in the corrosion rate determined by the moisture resistance test.

What is claimed is:

1. A nonchromate rust preventive agent for aluminum which comprises
   a zirconium compound in an amount of 100 to 100000 ppm as zirconium ion,
   a fluoride ion in an amount of 125–125000 ppm,
   a water-soluble resin in an amount of 100 to 100000 ppm on a nonvolatile matter basis, and
   an aluminum salt in an amount of 10 to 10000 ppm as aluminum ion,
   wherein said water-soluble resin has a functional group selected from the group consisting of a carboxyl, a hydroxyl, a sulfo, and an amino group, which forms a bond with the zirconium compound, aluminum, or both, in film formation.

2. The nonchromate rust preventive agent for aluminum according to claim 3, wherein said zirconium compound is selected from the group consisting of a fluorozirconic acid, an ammonium fluorozirconate, and mixtures thereof.

3. The nonchromate rust preventive agent for aluminum according to claim 1, wherein said zirconium compound is selected from the group consisting of a fluorozirconic acid, a lithium salt of fluorozirconic acid, a sodium salt of fluorozirconic acid, an ammonium salt of fluorozirconic acid, a zirconium sulfate, a zirconyl sulfate, a zirconium nitrate, a zirconyl nitrate, a zirconium fluoride, zirconium carbonate, and mixtures thereof.

4. The nonchromate rust preventive agent for aluminum according to claim 1 having a zirconium:fluorine ratio between about 0.5 by weight and about 0.9 by weight.

5. The nonchromate rust preventive agent for aluminum according to claim 1, wherein the amount of said zirconium compound is between about 1000 ppm and about 10000 ppm as zirconium ion.

6. The nonchromate rust preventive agent for aluminum according to claim 1, wherein the amount of said fluoride ion is between about 1250 ppm and about 12500 ppm.

7. The nonchromate rust preventive agent for aluminum according to claim 1, wherein the amount of said water-soluble resin is between about 1000 ppm and about 10000 ppm on a nonvolatile matter basis.

8. The nonchromate rust preventive agent for aluminum according to claim 1, wherein the amount of said aluminum salt is between about 100 ppm and about 5000 ppm in terms of aluminum ion.

9. The nonchromate rust preventive agent for aluminum according to claim 1, wherein said water-soluble resin is selected from the group consisting of (i) unsaturation-polymerizable water-soluble polymers having carboxyl and/or hydroxyl groups, (ii) naturally-occurring macromolecular compounds having carboxyl and/or hydroxyl groups and their derivatives, (iii) water-soluble polyester resins, (iv) water-soluble epoxy resins, (v) water-soluble polyurethane resins, (vi) water-soluble phenolic resins, and (vii) water-soluble amino resins.

10. A method for nonchromate rust prevention of aluminum which comprises treating an aluminum substrate with the nonchromate rust preventive agent according to claim 1 to form a film in the weight range of 10 to 1000 mg/m$^2$ in terms of zirconium.

11. An aluminum product which is obtained by a method of claim 10.

12. A method for nonchromate rust prevention of aluminum which comprises treating an aluminum substrate with the nonchromate rust preventive agent according to claim 2 to form a film in the weight range of 10 to 1000 mg/m$^2$ in terms of zirconium.

13. An aluminum product which is obtained by a method of claim 12.

* * * * *